United States Defensive Publication [19] (H) [11] T993,006

McConnell et al. [43] Apr. 1, 1980

[54] ADHESIVE COMPOSITION

[76] Inventors: Richard L. McConnell, 421 Manderley Rd., Kingsport, Tenn. 37660; Doyle A. Weemes, 1603 Moore Ave., Greeneville, Tenn. 37743; Frederick D. Petke, 1426 Watauga St., Kingsport, Tenn. 37660

[21] Appl. No.: 13,111

[22] Filed: Feb. 21, 1979

[51] Int. Cl.[2] ..... C08F 283/04; C08G 69/48; C08L 67/00

[52] U.S. Cl. ..... 525/425; 428/224

[57] ABSTRACT

Composition especially useful as an interlining adhesive comprising a physical blend of a copolyester powder and a polyamide powder. The polyester is derived from terephthalic acid and 1,4-butanediol in various combinations with isophthalic acid and/or 1,6-hexanediol, has a melting point of between about 90° and about 140° C. and a heat of fusion of from about 0.1 to about 10 calories per gram. The polyamide has a melting point of between about 50° C. and about 200° C.

20 Claims, No Sheets Drawing,

17 Pages Specification

The file of this unexamined application may be inspected and copies thereof may be purchased (849 O.G. 1221, Apr. 9, 1968).